(12) United States Patent
Hooftman et al.

(10) Patent No.: US 7,247,386 B2
(45) Date of Patent: Jul. 24, 2007

(54) COMPOSITION OF AN OLIGOMERIC FLUOROSILANE AND SURFACE TREATMENT OF RETROREFLECTIVE SHEET

(75) Inventors: Gert A. M. Hooftman, Tielrode (BE); Dorothee B. Loosen, Moenchengladbach (DE)

(73) Assignee: 3M Innovative Properties Company, St. Paul, MN (US)

( * ) Notice: Subject to any disclaimer, the term of this patent is extended or adjusted under 35 U.S.C. 154(b) by 461 days.

(21) Appl. No.: 10/744,684

(22) Filed: Dec. 23, 2003

(65) Prior Publication Data

US 2005/0137289 A1  Jun. 23, 2005

(51) Int. Cl.
G02B 5/128 (2006.01)
B32B 9/04 (2006.01)
B32B 27/30 (2006.01)

(52) U.S. Cl. .................. 428/447; 428/325; 428/421; 359/536; 359/539; 359/541

(58) Field of Classification Search ............ None
See application file for complete search history.

(56) References Cited

U.S. PATENT DOCUMENTS

| | | | |
|---|---|---|---|
| 2,326,634 A * | 8/1943 | Gebhard et al. ............ 359/540 |
| 2,378,252 A | 6/1945 | Staehle et al. |
| 2,407,680 A | 9/1946 | Palmquist et al. |
| 2,461,011 A | 2/1949 | Taylor et al. |
| 2,803,615 A | 8/1957 | Ahlbrecht et al. |
| 2,809,990 A | 10/1957 | Brown et al. |
| 2,934,450 A | 4/1960 | Brown |
| 3,222,204 A | 12/1965 | Weber et al. |
| 3,700,305 A | 10/1972 | Bingham |
| 3,810,874 A | 5/1974 | Mitsch et al. |
| 4,025,159 A | 5/1977 | McGrath |
| 4,085,137 A | 4/1978 | Mitsch et al. |
| 4,248,932 A | 2/1981 | Tung et al. |
| 4,713,295 A | 12/1987 | Laroche |
| 5,200,262 A | 4/1993 | Li |
| 5,274,159 A | 12/1993 | Pellerite et al. |
| 5,283,101 A | 2/1994 | Li |
| 5,306,758 A | 4/1994 | Pellerite |
| 5,405,929 A | 4/1995 | Kobayashi |
| 5,674,605 A | 10/1997 | Marecki |
| 5,812,317 A | 9/1998 | Billingsley et al. |
| 6,020,450 A | 2/2000 | Matsuda et al. |
| 6,582,759 B1 | 6/2003 | Qiu et al. |
| 2001/0053445 A1 * | 12/2001 | Kang et al. .............. 428/421 |
| 2002/0090515 A1 | 7/2002 | Pellerite et al. |
| 2003/0138643 A1 | 7/2003 | Moore et al. |
| 2003/0203186 A1 | 10/2003 | Jing et al. |

FOREIGN PATENT DOCUMENTS

| | | |
|---|---|---|
| EP | 0 267 728 A2 | 5/1988 |
| EP | 0 526 976 B1 | 1/1997 |
| EP | 0 759 179 B1 | 11/2001 |
| EP | 1 225 187 A1 | 7/2002 |
| JP | 8-309929 | 11/1996 |
| WO | WO 02/068353 A1 | 9/2002 |
| WO | WO 02/099476 A2 | 12/2002 |

OTHER PUBLICATIONS

"Polyurea/polysiloxane ceramer coatings", Ni et al., Elsevier, Progress in Organic Coatings 38 (2000), pp. 97-110.

"Aqueous Compositions of an Oligomeric Fluorosilane and Use Thereof For Surface Treatment of Optical Elements", U.S. Appl. No. 10/745,004, filed Dec. 23, 2003.

* cited by examiner

*Primary Examiner*—Marc S. Zimmer
(74) *Attorney, Agent, or Firm*—Scott A. Bardell

(57) ABSTRACT

The invention relates to a method of treatment of a retroreflective sheet with a treatment composition that comprises a fluorinated compound having one or more silyl groups and an auxiliary compound selected from the group consisting of (i) one or more non-fluorinated compounds of an element M selected from Si, Ti, Zr, B, Al, Ge, V, Pb and Sn and (ii) an organic compound having a Si—H group. The invention also relates to compositions comprising (i) a fluorinated compound comprising one or more silyl groups and (ii) an auxiliary compound selected from the group consisting of organic compounds having a Si—H group.

9 Claims, No Drawings

COMPOSITION OF AN OLIGOMERIC FLUOROSILANE AND SURFACE TREATMENT OF RETROREFLECTIVE SHEET

FIELD

The invention relates to a method of treatment of a retroreflective sheet with a fluorinated treatment composition and fluorinated compositions.

BACKGROUND

Retroreflective articles have the ability to return a substantial portion of incident light in the direction from which the light originated. This unique ability has lead to the widespread use of retroreflective articles on clothing worn by highway construction and maintenance workers and fire-fighters. The retroreflective articles displayed on their clothing typically are in the form of retroreflective stripes. The retroreflective stripes typically comprise a layer of microspheres such as glass beads. The retroreflective articles improve the wearers' safety by highlighting their presence.

Several basic types of microsphere-containing retroreflective materials are known. On the one hand, so-called embedded or encapsulated lens type sheetings are known in which the microspheres are covered by a transparent resin layer, i.e., they are fully buried and not exposed to air. The second type of reflective sheeting having microspheres is the so-called open-bead or open-lens material in which the microspheres are partially exposed to air, i.e., they are not completely buried in a binder layer. A third type of microsphere sheeting is similar to the second type, with the exception that a polymeric cover film is heat-sealed intermittently over the microsphere-bearing surface of the reflective sheet. The microspheres in the enclosed lens sheeting are exposed to air (beneath the polymeric cover film), but are not exposed to the elements such as rainfall and are not considered to be open-bead sheeting.

A particular disadvantage of the open-bead reflective sheeting is its reduced reflectivity under rainfall conditions. Moreover, the reflectivity of the sheeting often diminishes after several launderings.

JP 08-309929 discloses treating the exposed glass bead of an open-bead type reflective sheet with a combination of a fluorochemical compound and a silane coupling agent. As the fluorochemical compound, there is taught a perfluoroalkyl acrylic acid ester. Also, it is recommended to additionally use a melamine resin or an isocyanate crosslinking agent so as to further improve the durability of the treatment.

EP 1,262,802 provides a reflective sheet that comprises a reflective element and that comprises microspheres partially exposed at a major surface of the reflective sheet. The reflective sheet has further been treated with a fluorinated silane compound that has a fluorinated group and a silane group having one or more hydrolyzable groups.

While some of the known surface treatments may be capable of providing acceptable levels of initial repellent properties, a loss of repellency is often encountered due to repeated launderings. Further, it would be desirable to improve the reflective properties of the open-bead reflective sheet material under rainfall conditions.

Accordingly, it is desirable to provide a coating composition capable of providing a high durable water repellent coating on a retroreflective sheet. In particular, it is desirable to provide a durable coating wherein the initial reflective and repellent properties are substantially maintained, even under repeated launderings. It will typically also be desired that the treatment composition has good storage stability, minimal environmental disadvantages and can be conveniently manufactured at minimal costs.

SUMMARY

The invention, in a first aspect, provides a method of treatment comprising contacting a retroreflective sheet comprising (i) a binder layer having at one of its major surfaces a layer of microspheres having a portion partially embedded in said major surface of said binder layer and having a portion partially protruding therefrom and (ii) a reflective layer disposed on the embedded portion of the microspheres, with a treatment composition comprising:

(i) a fluorinated compound having one or more fluorinated groups and one or more silyl groups that have one or more hydrolysable groups; and (ii) an auxiliary compound selected from the group consisting of (1) one or more non-fluorinated compounds of an element M selected from the group consisting of Si, Ti, Zr, B, Al, Ge, V, Pb and Sn having at least one hydrolysable group per molecule, (2) an organic compound having a Si—H group and mixtures thereof.

In a further aspect, the invention provides a composition comprising (i) a fluorinated compound having one or more fluorinated groups and one or more silyl groups that have one or more hydrolysable groups, and (ii) an auxiliary compound selected from the group consisting of organic compounds having a Si—H group and mixtures thereof.

In still a further aspect, the invention relates to a composition as described above, further comprising one or more non-fluorinated compounds of an element M selected from the group consisting of Si, Ti, Zr, B, Al, Ge, V, Pb and Sn having at least one hydrolysable group per molecule.

It was found that the retroreflective sheets treated by the treatment method of the present invention have improved reflective and repellent properties. In particular, it was found that the reflectivity and the water repellency of the treated retroreflective sheets is highly durable, even after repeated launderings. Furthermore, the reflectivity of the retroreflective sheets under wet conditions, in particular rainfall conditions, is typically improved as a result of the treatment.

DETAILED DESCRIPTION

Fluorinated Compound

Fluorinated compounds suitable for use in the treatment of the retroreflective sheets of the present invention comprise one or more fluorinated groups and one or more silyl groups having one or more hydrolyzable groups. By the term "hydrolyzable group" is meant that the groups are capable of hydrolyzing under the conditions used to prepare the fluorinated treatment composition and/or the conditions to apply the fluorinated composition to the retroreflective sheet. Such conditions may involve the use of a catalyst such as an acid or base. Examples of suitable hydrolyzable groups include alkoxy groups, aryloxy groups, halogens such as chlorine, acetoxy groups and acyl groups. Generally preferred are lower alkoxy groups having 1 to 4 carbon atoms.

The fluorinated compound may contain one or more, for example two or three, silane groups linked directly to a fluorinated group or they may be linked to a fluorinated group through an organic linking group. Such an organic linking group is generally a non-fluorinated group such as a hydrocarbon group and may contain one or more heteroatoms.

The fluorinated compound may comprise any fluorinated group including fluoroaliphatic groups and fluorinated polyether groups. The fluorinated group of the fluorinated compound may be partially or fully fluorinated and may be monovalent or multivalent, e.g., divalent. The fluorinated group may further comprise a fluorinated oligomer, derived from the polymerisation of at least one fluorinated monomer in the presence of a chain transfer agent and optionally one or more non-fluorinated monomers.

In a particular embodiment the fluorinated compound for use in the invention is a fluorinated silane corresponding to the formula:

$$R_f^1-[Q-SiY_{3-x}R^{10}_x]_y \quad (I)$$

wherein $R_f^1$ represents a monovalent or divalent fluorinated group,
Q represents an organic divalent linking group,
$R^{10}$ represents a $C_1$-$C_4$ alkyl group,
Y represents a hydrolyzable group;
x is 0, 1 or 2 and
y is 1 or 2.

According to a particular embodiment, $R_f^1$ represents a fluoroaliphatic group, which is stable, inert and preferably saturated and non-polar. The fluoroaliphatic group may be straight chain, branched chain, or cyclic or combinations thereof and may contain one or more heteroatoms such as oxygen, divalent or hexavalent sulfur, or nitrogen. The fluoroaliphatic group is preferably fully-fluorinated, but hydrogen or chlorine atoms can be present as substituents if not more than one atom of either is present for every two carbon atoms. Suitable fluoroaliphatic groups generally have at least 3 and up to 18 carbon atoms, preferably 3 to 14, especially 4 to 10 carbon atoms, and preferably contain about 40% to about 80% fluorine by weight, more preferably about 50% to about 79% fluorine by weight. The terminal portion of the fluoroaliphatic group is typically a perfluorinated moiety, which will preferably contain at least 7 fluorine atoms, e.g., $CF_3CF_2CF_2$—, $(CF_3)_2CF$—, $F_5SCF_2$—. The preferred fluoroaliphatic groups are fully or substantially fluorinated and include those perfluorinated aliphatic radicals of the formula $C_nF_{2n+1}$— where n is 3 to 18, particularly 4 to 10.

According to one embodiment, $R_f^1$ represents a monovalent or divalent polyfluoropolyether group. The polyfluoropolyether group can include linear, branched, and/or cyclic structures, and may be saturated or unsaturated. It is preferably a perfluorinated group (i.e., all C—H bonds are replaced by C—F bonds). More preferably, it includes perfluorinated repeating units selected from the group of —$(C_nF_{2n})$—, —$(C_nF_{2n}O)$—, —$(CF(Z))$—, —$(CF(Z)O)$—, —$(CF(Z)C_nF_{2n}O)$—, —$(C_nF_{2n}CF(Z)O)$—, —$(CF_2CF(Z)O)$—, and combinations thereof. In these repeating units Z is a perfluoroalkyl group, an oxygen-substituted perfluoroalkyl group, a perfluoroalkoxy group, or an oxygen-substituted perfluoroalkoxy group, all of which can be linear, branched, or cyclic, and preferably have about 1 to about 9 carbon atoms and 0 to about 4 oxygen atoms. Examples of polyfluoropolyethers containing polymeric moieties made of these repeating units are disclosed in U.S. Pat. No. 5,306, 758 (Pellerite). For the monovalent polyfluoropolyether group (wherein y is 1 in formula (I) above), the terminal groups can be $(C_nF_{2n+1})$—, $(C_nF_{2n+1}O)$— or $(X'C_nF_{2n}O)$—, wherein X' is H, Cl, or Br, for example. Preferably, these terminal groups are perfluorinated. In these repeating units or terminal groups, n is 1 or more, and preferably 1 to 4.

Preferred approximate average structures for a divalent fluorinated polyether group include —$CF_2O(CF_2O)_m(C_2F_4O)_pCF_2$—, wherein an average value for m and p is 0 to 50, with the proviso that m and p are not simultaneously 0, —$CF(CF_3)O(CF(CF_3)CF_2O)_pCF(CF_3)$—, —$CF_2O(C_2F_4O)_pCF_2$—, and —$(CF_2)_3O(C_4F_8O)_p(CF_2)_3$—, wherein an average value for p is 3 to 50. Of these, particularly preferred approximate average structures are —$CF_2O(CF_2O)_m(C_2F_4O)_pCF_2$—, —$CF_2O(C_2F_4O)_pCF_2$—, and —$CF(CF_3)O(CF(CF_3)CF_2O)_pCF(CF_3)$—. Particularly preferred approximate average structures for a monovalent perfluoropolyether group include $C_3F_7O(CF(CF_3)CF_2O)_pCF(CF_3)$— and $CF_3O(C_2F_4O)_pCF_2$— wherein an average value for p is 3 to 50. As synthesized, these compounds typically include a mixture of polymers. The approximate average structure is the approximate average of the mixture of polymers.

The divalent linking group Q can include linear, branched, and/or cyclic structures, that may be saturated or unsaturated. The group Q can contain one or more heteroatoms (e.g., oxygen, nitrogen, or sulfur) or functional groups (e.g., carbonyl, amido, urethanylene or sulfonamido). Preferably, the divalent linking group Q is a non-fluorinated organic group such as a hydrocarbon group, preferably, a linear hydrocarbon group, optionally containing heteroatoms or functional groups, and more preferably, containing at least one functional group. Examples of Q groups include —$C(O)NH(CH_2)_3$—, —$CH_2O(CH_2)_3$—, —$CH_2OC(O)N(R)(CH_2)_3$—, wherein R is H or lower alkyl group, and —$(C_nH_{2n})$—, wherein n is about 2 to about 6. A typical linking group Q is —$C(O)NH(CH_2)_3$—.

Y represents a hydrolyzable group in formula (I) such as for example a halogen, a $C_1$-$C_4$ alkoxy group, an acyloxy group, an acyl group or a polyoxyalkylene group, such as polyoxyethylene groups as disclosed in U.S. Pat. No. 5,274, 159. Specific examples of hydrolyzable groups include methoxy, ethoxy and propoxy groups, chlorine and an acetoxy group.

Compounds of formula (I) suitable for use in the present invention typically have a molecular weight (number average) of at least about 200, and preferably, at least about 1000. Preferably, they are no greater than about 10000.

Examples of preferred fluorinated silane compounds according to formula (I) include, but are not limited to, the following approximate average structures: $XCF_2O(CF_2O)_m(C_2F_4O)_pCF_2X$, $C_3F_7O(CF(CF_3)CF_2O)_pCF(CF_3)X$, $XCF(CF_3)O(CF(CF_3)CF_2O)_pCF(CF_3)X$, $XCF_2O(C_2F_4O)_pCF_2X$, and $CF_3O(C_2F_4O)_pCF_2X$, $X(CF_2)_3O(C_4F_8O)_p(CF_2)_3X$, wherein —X is -Q-$SiY_{3-x}R^{10}_x$ as defined above in formula (I) or a nonsilane-containing terminal group as defined above $((C_nF_{2n+1})$—, $(C_nF_{2n+1}O)$— or $(X'C_nF_{2n}O)$— wherein X' is H, Cl, or Br), with the proviso that at least one X group per molecule is a silane). Preferably, in each fluorinated polyether silane, Q contains a nitrogen atom. More preferably, at least one X group per molecule is $C(O)NH(CH_2)_3Si(OR)_3$ (wherein R is methyl, ethyl, polyethyleneoxy or mixtures thereof), and the other X group, if not a silane, is $OCF_3$, or $OC_3F_7$. The values of m and p in these approximate average structures can vary. Preferably, an average value of m is within a range of about 1 to about 50, and an average value of p is within a range of about 4 to about 40. As these are polymeric materials, such compounds exist as mixtures upon synthesis, which are suitable for use. These mixtures may also contain perfluoropolyether chains bearing no functional groups (inert fluids) or more than two terminal groups (branched structures) as a consequence of the methods used in their synthesis. Typically, mixtures of polymeric materials containing less than about 10% by weight of non-functionalized polymers (e.g., those without silane groups) can be used. Furthermore, mixtures of any of the individually listed compounds of formula (I) can be used.

Compounds of formula (I) can be synthesized using standard techniques and are commercially available. For example, commercially available or readily synthesized fluorinated polyether esters can be combined with a functionalized alkoxysilane, such as a 3-aminopropylalkoxysilane, according to U.S. Pat. No. 3,810, 874 (Mitsch et al.). Such materials may or may not need to be purified before use in a method of treatment or a composition according to the invention.

According to a further embodiment the fluorinated compounds for use in the invention can be derived from fluorinated oligomers having one or more silyl groups that have one or more hydrolysable groups as defined above. The fluorinated oligomers can be prepared by free-radical oligomerization of at least one fluorinated monomer in the presence of a chain transfer agent and optionally one or more non-fluorinated monomers and wherein at least one of said non-fluorinated monomers and/or chain transfer agent comprises a silyl group that has one or more hydrolysable groups. Fluorochemical oligomers for use in this invention include those that may be represented by the general formula (II):

wherein A represents the residue of an initiator or hydrogen;
$M^f$ represents units derived from fluorinated monomers;
$M^h$ represents units derived from non-fluorinated monomers;
$M^a$ represents units having a silyl group represented by the formula:

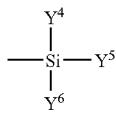

wherein each of $Y^4, Y^5$ and $Y^6$ independently represents an alkyl group, an aryl group or a hydrolyzable group;
G is a monovalent organic group comprising the residue of a chain transfer agent;
q represents a value of 1 to 100;
r represents a value of 0 to 100;
s represents a value of 0 to 100;
and q+r+s is at least 2;
with the proviso that at least one of the following conditions is fulfilled: (a) G is a monovalent organic group that contains a silyl group of the formula:

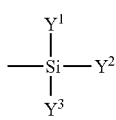

wherein $Y^1, Y^2$ and $Y^3$ each independently represents an alkyl group, an aryl group or a hydrolyzable group with at least one of $Y^1, Y^2$ and $Y^3$ representing a hydrolyzable group or (b) s is at least 1 and at least one of $Y^4, Y^5$ and $Y^6$ represents a hydrolyzable group.

The silyl groups having one or more hydrolysable groups can be included in the fluorochemical oligomer by copolymerising the fluorochemical monomer with a monomer having a silyl group that has one or more hydrolyzable groups or through the use of a chain transfer agent that includes such a silyl group. Alternatively, a functionalised chain transfer agent or functionalised comonomer can be used which can be reacted with a reagent having a silyl group having one or more hydrolyzable groups subsequent to the oligomerization.

The total number of units represented by the sum of q, r and s is generally at least 2 and preferably at least 3 so as to render the compound oligomeric. The value of q in the fluorochemical oligomer is between 1 and 100 and preferably between 2 and 20. The values of r and s are between 0 and 100 and preferably between 1 and 30. According to a preferred embodiment, the value of r is less than that of q and q+r+s is at least 2.

The fluorinated oligomer silanes according to formula (II) typically have an average molecular weight between 400 and 100000, preferably between 600 and 20000. The fluorochemical silane preferably contains at least 10 mole % (based on total moles of units $M^f$, $M^h$ and $M^a$) of hydrolysable groups.

It will further be appreciated by one skilled in the art that the preparation of fluorochemical oligomers results in a mixture of compounds and accordingly, general formula (II) should be understood as representing a mixture of compounds whereby the indices q, r and s in formula (II) represent the molar amount of the corresponding unit in such mixture. Accordingly, it will be clear that q, r and s can be fractional values.

The units $M^f$ of the fluorochemical oligomer are generally derived from fluorochemical monomers corresponding to the formula:

wherein $R^2_f$ represents a fluoroaliphatic group containing at least 3 carbon atoms or a fluorinated polyether group. $Q^1$ represents an organic divalent linking group and $E^1$ represents a free radical polymerizable group.

The fluoroaliphatic group $R^2_f$ in the fluorochemical monomer, is a fluorinated, stable, inert, preferably saturated, non-polar, monovalent aliphatic radical. It can be straight chain, branched chain, or cyclic or combinations thereof. It can contain heteroatoms such as oxygen, divalent or hexavalent sulfur, or nitrogen. $R^2_f$ is preferably a fully-fluorinated radical, but hydrogen or chlorine atoms can be present as substituents if not more than one atom of either is present for every two carbon atoms. The $R^2_f$ radical has at least 3 and up to 18 carbon atoms, preferably 3 to 14, especially 4 to 10 carbon atoms, and preferably contains about 40% to about 80% fluorine by weight, more preferably about 50% to about 79% fluorine by weight. The terminal portion of the $R^2_f$ radical is a perfluorinated moiety, which will preferably contain at least 7 fluorine atoms, e.g., $CF_3CF_2CF_2$—, $(CF_3)_2CF$—, $F_5SCF_2$—. The preferred $R^2_f$ radicals are fully or substantially fluorinated and are preferably those perfluorinated aliphatic radicals of the formula $C_nF_{2n+1}$— where n is 3 to 18, particularly 4 to 10.

The $R^2_f$ group can further represent a monovalent polyfluoropolyether group, as for example defined above with respect to $R^1_f$.

$M^f$ in formula (II) can also be derived from a difunctional fluorochemical monomer corresponding to the formula:

$$E^a\text{-}Q^a\text{-}R^3_f\text{-}Q^b\text{-}E^b \quad (IV)$$

wherein $Q^a$ and $Q^b$ each independently represents an organic divalent linking group and $E^a$ and $E^b$ each independently represent a free radical polymerizable group. $R^3_f$ represents a divalent perfluoropolyether group such as —(CF(CF$_3$)CF$_2$O)$_p$—, —(CF$_2$O)$_p$(CF$_2$CF$_2$O)$_q$—, —CF(CF$_3$)(CF$_2$CF(CF$_3$)O)$_p$CF(CF$_3$)O—, —(CF$_2$O)$_p$(CF$_2$CF$_2$O)$_q$CF$_2$—, —(CF$_2$CF$_2$O)$_p$—, —(CF$_2$CF$_2$CF$_2$O)$_p$—, wherein an average value for p and q is 1 to about 50. The molecular weight of the difunctional fluorochemical monomer should generally be between about 200 and 3000, more preferably between 300 and 2500. The amount of difunctional fluorochemical monomer used should be chosen so as to obtain a composition which is soluble or dispersible in an organic solvent or in water.

The linking groups $Q^1$, $Q^a$ and $Q^b$ in the above formulae (III) and (IV) link the fluoroaliphatic or the fluorinated polyether group $R^2_f$ or $R^3_f$ to the free radical polymerizable group $E^1$, $E^a$ or $E^b$ and are generally non-fluorinated organic linking groups. The linking groups preferably contain from 1 to about 20 carbon atoms and may optionally contain oxygen, nitrogen, or sulfur-containing groups or a combination thereof. The linking groups are preferably free of functional groups that substantially interfere with free-radical oligomerization (e.g., polymerizable olefinic double bonds, thiols, and other such functionality known to those skilled in the art). Examples of suitable linking groups $Q^{1,a,b}$ include straight chain, branched chain or cyclic alkylene, arylene, aralkylene, oxy, oxo, hydroxy, thio, sulfonyl, sulfoxy, amino, imino, sulfonamido, carboxyamido, carbonyloxy, urethanylene, ureylene, and combinations thereof such as sulfonamidoalkylene. Preferred linking groups are selected from the group consisting of alkylene and an organic divalent linking group according to the following formulae:

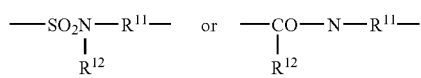

wherein $R^{11}$ represents a hydrogen or a linear or branched alkylene having 2 to 4 carbon atoms and $R^{12}$ represents a hydrogen or an alkyl having 1 to 4 carbon atoms.

$E^1$, $E^a$ and $E^b$ are free radically polymerizable groups that typically contain an ethylenically unsaturated group capable of undergoing a free radical polymerization. Suitable groups include, for example, moieties derived from vinyl ethers, vinyl esters, allyl esters, vinyl ketones, styrene, vinyl amide, acrylamides, maleates, fumarates, acrylates and methacrylates. Of these, the esters of alpha, beta unsaturated acids, such as the acrylates and methacrylates are preferred.

Fluorochemical monomers $R^2_f$-$Q^1$-$E^1$ as described above and methods for the preparation thereof are known and disclosed, e.g., in U.S. Pat. No. 2,803,615. Examples of such compounds include general classes of fluorochemical acrylates, methacrylates, vinyl ethers, and allyl compounds containing fluorinated sulfonamido groups, acrylates or methacrylates derived from fluorochemical telomer alcohols, acrylates or methacrylates derived from fluorochemical carboxylic acids, and perfluoroalkyl acrylates or methacrylates as disclosed in EP 526 976.

Fluorinated polyetheracrylates or methacrylates are described in U.S. Pat. No. 4,085,137.

Typical examples of fluorochemical monomers include:
CF$_3$(CF$_2$)$_2$CH$_2$OCOC(CH$_3$)=CH$_2$
CF$_3$ (CF$_2$)$_2$CH$_2$OCOCH=CH$_2$
C$_4$F$_9$CH$_2$CH$_2$OC(O)CH=CH$_2$
C$_4$F$_9$CH$_2$CH$_2$OC(O)C(CH$_3$)=CH$_2$
CF$_3$(CF$_2$)$_7$(CH$_2$)$_2$OCOCH=CH$_2$
CF$_3$(CF$_2$)$_7$(CH$_2$)$_2$OCOC(CH$_3$)=CH$_2$

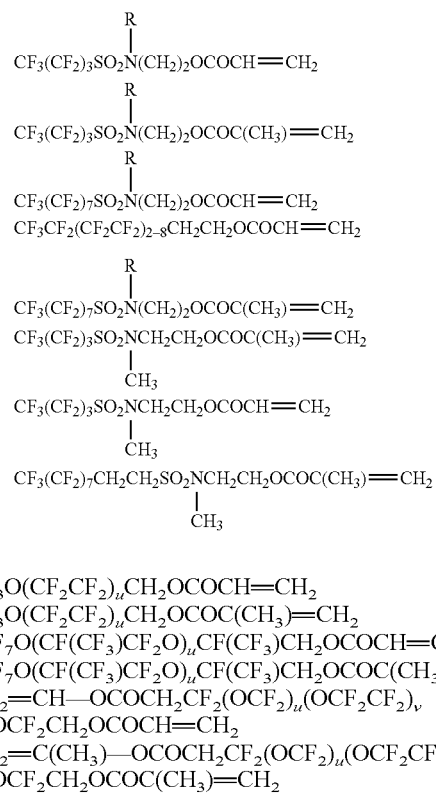

CF$_3$O(CF$_2$CF$_2$)$_u$CH$_2$OCOCH=CH$_2$
CF$_3$O(CF$_2$CF$_2$)$_u$CH$_2$OCOC(CH$_3$)=CH$_2$
C$_3$F$_7$O(CF(CF$_3$)CF$_2$O)$_u$CF(CF$_3$)CH$_2$OCOCH=CH$_2$
C$_3$F$_7$O(CF(CF$_3$)CF$_2$O)$_u$CF(CF$_3$)CH$_2$OCOC(CH$_3$)=CH$_2$
CH$_2$=CH—OCOCH$_2$CF$_2$(OCF$_2$)$_u$(OCF$_2$CF$_2$)$_v$OCF$_2$CH$_2$OCOCH=CH$_2$
CH$_2$=C(CH$_3$)—OCOCH$_2$CF$_2$(OCF$_2$)$_u$(OCF$_2$CF$_2$)$_v$OCF$_2$CH$_2$OCOC(CH$_3$)=CH$_2$

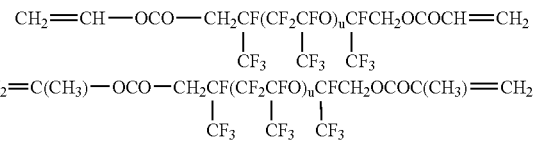

wherein R represents methyl, ethyl or n-butyl and u and v are about 1 to 50.

The units $M^h$ of the fluorinated oligomer silane (when present) are generally derived from a non-fluorinated monomer, preferably a monomer consisting of a polymerizable group and a hydrocarbon moiety.

Examples of non-fluorinated monomers from which the units $M^h$ can be derived include general classes of ethylenic compounds capable of free-radical polymerization, such as, for example, allyl esters such as allyl acetate and allyl heptanoate; alkyl vinyl ethers or alkyl allyl ethers such as cetyl vinyl ether, dodecylvinyl ether, 2-chloroethylvinyl ether, ethylvinyl ether; unsaturated acids such as acrylic acid, methacrylic acid, alpha-chloro acrylic acid, crotonic acid, maleic acid, fumaric acid, itaconic acid and their anhydrides and their esters such as vinyl, allyl, methyl, butyl, isobutyl, hexyl, heptyl, 2-ethylhexyl, cyclohexyl, lauryl, stearyl, isobornyl or alkoxy ethyl acrylates and methacrylates; alpha-beta unsaturated nitriles such as acrylonitrile, methacrylonitrile, 2-chloroacrylonitrile, 2-cyanoethyl acrylate, alkyl cyanoacrylates; alpha,beta-unsaturated carboxylic acid derivatives such as allyl alcohol, allyl glycolate, acrylamide, methacrylamide, n-diisopropyl acrylamide, diacetoneacrylamide, N,N-diethylaminoethylmethacrylate, N-t-butylamino ethyl methacrylate; styrene and its derivatives such as vinyltoluene, alpha-methylstyrene, alpha-cyanomethyl styrene; lower olefinic hydrocarbons which can contain halogen such as ethylene, propylene, isobutene, 3-chloro-1-isobutene, butadiene, isoprene, chloro and dichlorobutadiene and 2,5-dimethyl-1,5-hexadiene, and allyl or vinyl halides such as vinyl and vinylidene chloride. Preferred non-fluorinated monomers include hydrocarbon group containing monomers such as those selected from octadecylmethacrylate, laurylmethacrylate, butylacrylate, N-methylol acrylamide, isobutylmethacrylate, ethylhexyl acrylate and ethylhexyl methacrylate; and vinylchloride and vinylidene chloride.

The fluorinated oligomer having one or more silyl groups, useful in the invention generally further includes units $M^a$ that have a silyl group that has one or more hydrolysable groups. Examples of units $M^a$ include those that correspond to the general formula:

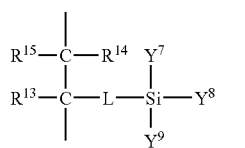
(V)

wherein $R^{13}$, $R^{14}$ and $R^{15}$ each independently represents hydrogen, an alkyl group such as for example methyl or ethyl, halogen or an aryl group, L represents an organic divalent linking group and $Y^7$, $Y^8$ and $Y^9$ independently represents an alkyl group, an aryl group, or a hydrolysable group.

Such units $M^a$ may be derived from a monomer represented by the formula:

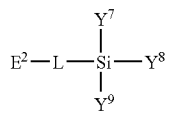
(VI)

wherein each of $Y^7$, $Y^8$ and $Y^9$ independently represents an alkyl group, an aryl group, or a hydrolysable group; L represents a chemical bond or an organic divalent linking group and $E^2$ represents a free radical polymerizable group such as for example listed above with respect to $E^1$. Alternatively such units $M^a$ according to formula (V) can be obtained by reacting a functionalized monomer with a silyl group containing reagent. By the term "functionalised monomer" is meant a monomer that has one or more groups available for subsequent reaction, for example a group capable of undergoing a condensation reaction. Typically, the functionalised monomer is a monomer that has one or more groups capable of reacting with isocyanate or epoxy groups. Specific examples of such groups include hydroxy and amino groups. Examples of silyl group containing reagents include e.g., 3-isocyanatopropyltrimethoxysilane or 3-epoxypropyltrimethoxysilane.

When L represents an organic divalent linking group, it preferably contains from 1 to about 20 carbon atoms. L can optionally contain oxygen, nitrogen, or sulfur-containing groups or a combination thereof, and L is preferably free of functional groups that substantially interfere with free-radical oligomerization (e.g., polymerizable olefinic double bonds, thiols, and other such functionality known to those skilled in the art). Examples of suitable linking groups L include straight chain, branched chain or cyclic alkylene, arylene, aralkylene, oxyalkylene, carbonyloxyalkylene, oxycarboxyalkylene, carboxyamidoalkylene, urethanylenealkylene, ureylenealkylene and combinations thereof. Preferred linking groups are selected from the group consisting of alkylene, oxyalkylene and carbonyloxyalkylene. According to a particularly preferred embodiment, the linking group L corresponds to the formula:

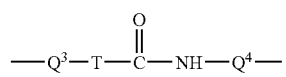

wherein $Q^3$ and $Q^4$ independently represents an organic divalent linking group. Examples of organic divalent linking groups $Q^3$ include for example an alkylene, an arylene, oxyalkylene, carbonyloxyalkylene, oxycarboxyalkylene, carboxyamidoalkylene, urethanylenealkylene and ureylenealkylene. Examples of organic divalent linking groups $Q^4$ include for example alkylene and arylene. T represents O or NR wherein R represents hydrogen, a $C_1$-$C_4$ alkyl group or an aryl group.

$Y^7$, $Y^8$ and $Y^9$ independently represents an alkyl group, an aryl group or a hydrolysable group.

Examples of monomers according to formula (VI) include vinyltrichlorosilane, vinyltrimethoxysilane, vinyltriethoxysilane and alkoxysilane functionalised acrylates or methacrylates, such as methacryloyloxypropyl trimethoxysilane.

The fluorinated oligomer having one or more silyl groups is conveniently prepared in the presence of a chain transfer agent. Suitable chain transfer agents typically include a hydroxy-, amino-, mercapto or halogen group. The chain transfer agent may include two or more of such hydroxy, amino-, mercapto or halogen groups. Typical chain transfer agents useful in the preparation of the fluorinated oligomer include those selected from 2-mercaptoethanol, 3-mercapto-2-butanol, 3-mercapto-2-propanol, 3-mercapto-1-propanol, 3-mercapto-1,2-propanediol, 2-mercapto-ethylamine, di(2-mercaptoethyl)sulfide, octylmercaptane and dodecylmercaptane. Further, the chain transfer agent may be a polysiloxane having one or more mercapto groups.

In a preferred embodiment a chain transfer agent containing a silyl group having one or more hydrolyzable groups is used in the oligomerization to produce the fluorinated oligomer. Chain transfer agents including such a silyl group include those according to formula (VII).

(VII)

wherein $Y^{10}$, $Y^{11}$ and $Y^{12}$ each independently represents an alkyl group, preferably a $C_1$-$C_8$ alkyl group such as methyl, ethyl or propyl or an alkyl group containing a cycloalkyl such as cyclohexyl or cylcopentyl, an aryl group such as phenyl, an alkylaryl group or an aralkyl group, a hydrolysable group such as for example halogen or alkoxy group such as methoxy, ethoxy or aryloxy group, with at least one of $Y^{10}$, $Y^{11}$ and $Y^{12}$ representing a hydrolysable group. $L^1$ represents a divalent linking group.

Preferred chain transfer agents are those in which $L^1$ represents —S-$Q^5$- with $Q^5$ being linked to the silicone atom in formula (VII) and wherein $Q^5$ represents an organic divalent linking group such as for example a straight chain, branched chain or cyclic alkylene, arylene or aralkylene. The use of such chain transfer agent will generally result in fluorinated oligomers in which the monovalent organic group G corresponds to the following formula:

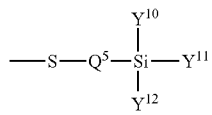

wherein $Y^{10}$, $Y^{11}$, $Y^{12}$ and $Q^5$ have the meaning as defined above.

A single chain transfer agent or a mixture of different chain transfer agents may be used. The preferred chain transfer agents are 2-mercaptoethanol, octylmercaptane and 3-mercaptopropyltrimethoxysilane. A chain transfer agent is typically present in an amount sufficient to control the number of polymerized monomer units in the oligomer and to obtain the desired molecular weight of the oligomeric fluorinated silane. The chain transfer agent is generally used in an amount of about 0.05 to about 0.5 equivalents, preferably about 0.25 equivalents, per equivalent of monomer including fluorinated and non-fluorinated monomers.

The fluorinated oligomer silane for use in the present invention contains one or more hydrolyzable groups. These hydrolysable groups may be introduced in the fluorinated silane by oligomerising in the presence of a chain transfer agent having a silyl group containing one or more hydrolysable groups, for example a chain transfer agent according to formula (VII) above wherein at least one of $Y^{10}$, $Y^{11}$ and $Y^{12}$ represents a hydrolysable group and/or by co-oligomerising with a monomer containing a silyl group having one or more hydrolysable groups such as a monomer according to formula (VI) above wherein at least one of $Y^7$, $Y^8$ and $Y^9$ represents a hydrolysable group. Alternatively, a functionalised chain transfer agent or functionalised comonomer can be used which can be reacted with a silyl group containing reagent subsequent to the oligomerization.

The fluorinated oligomer having one or more silyl groups, for use in the present invention, can be prepared through a free radical polymerisation as described in EP 1 225 187.

The amount of fluorinated compound having one or more fluorinated groups and one or more silyl groups for use in the present invention may vary widely and the optimal amount can be determined by one skilled in the art through experimentation. Typically, an amount of 1% by weight to 90% by weight, preferably between 10% by weight and 85% by weight, more preferably between 20% by weight to 80% by weight on the total weight of fluorinated compound and auxiliary compounds is included in the treatment composition.

Auxiliary Compound

Non-Fluorinated Compound of Element M

The composition useful in the present invention comprises one or more non-fluorinated compounds of an element M selected from the group consisting of Si, Ti, Zr, B, Al, Ge, V, Pb and Sn having at least one hydrolysable group per molecule. Preferably, the hydrolysable groups are directly bonded to the element M.

In one embodiment of the present invention, the non-fluorinated compound of element M comprises a compound according to the formula (VIII):

wherein R represents a non-hydrolysable group, M represents an element selected from the group consisting of Si, Ti, Zr, B, Al, Ge, V, Pb and Sn, j is 3 or 4 depending on the valence of M, i is 0,1 or 2, and Y represents a hydrolysable group.

The hydrolysable groups present in the non-fluorinated compound of element M may be the same or different and are generally capable of hydrolyzing under appropriate conditions, for example under acidic or basic aqueous conditions, such that the non-fluorinated compound of element M can undergo condensation reactions. Preferably, the hydrolysable groups upon hydrolysis yield groups capable of undergoing condensation reactions, such as hydroxyl groups.

Typical and preferred examples of hydrolysable groups include those as described with respect to the fluorinated compound. Preferably, the non-fluorinated compound of element M includes tetra-, tri- or dialkoxy (preferably containing 1 to 4 carbon atoms) compounds.

The non-hydrolysable groups R may be the same or different and are generally not capable of hydrolyzing under the conditions listed above. For example, the non-hydrolysable groups R may be independently selected from a hydrocarbon group, for example a $C_1$-$C_{30}$ alkyl group, which may be straight chained or branched and may include one or more aliphatic, cyclic hydrocarbon structures, a $C_6$-$C_{30}$ aryl group (optionally substituted by one or more substituents selected from halogens and $C_1$ -$C_4$ alkyl groups), or a $C_7$-$C_{30}$ aralkyl group.

In one embodiment the non-hydrolysable groups R are independently selected from a hydrocarbon group, for example a $C_1$-$C_{30}$ alkyl group and a $C_6$-$C_{20}$ aryl group (optionally substituted by one or more substituents selected from halogens and $C_1$-$C_4$ alkyl groups).

Preferred non-fluorinated compound of element M include those in which M is Ti, Zr, Si or Al.

Representative examples of non-fluorinated compound of element M include tetramethoxy silane, tetraethoxysilane, methyltriethoxysilane, dimethyl diethoxysilane, octadecyl triethoxysilane, methyltrichlorosilane, tetramethyl orthotitanate, tetraethyl orthotitanate, tetra-iso-propyl orthotitanate, tetra-n-propyl orthotitanate, tetra (2-ethylhexyl)orthotitanate, tetraethyl zirconate, tetra-iso-propyl zirconate, tetra-n-propyl zirconate and the like. More preferred compounds include $C_1$-$C_4$ alkoxy derivatives of Si, Ti and Zr. Particularly preferred non-fluorinated compounds of element M include tetra ethoxysilane. Single compounds or mixtures of non-fluorinated compounds of element M may be used. Non-fluorinated compound of element M can be completely or partially hydrolysed or precondensed before addition to the fluorinated treatment composition.

The amount of non-fluorinated compound of an element M for use in the present invention may vary widely and the optimal amount can be readily determined by one skilled in the art by routine experimentation. Typically the compound may be included in the composition in an amount up to 99% by weight, preferably between 10 and 80% by weight based on the total weight of fluorinated compound and auxiliary compounds.

Organic Compound having Si—H Group

The organic compound having one or more Si—H groups for use with this invention may be a non-polymeric organic compound or can be a polymeric organic compound. By "polymeric compound" is meant that the compound comprises repeating units that are actually or conceptually derived from lower molecular weight compounds, i.e., monomers. The polymerization degree may vary widely and includes a low polymerization degree such as for example a polymerization degree of 2 to 50 repeating units as well as a large polymerization degree of more than 50. Thus, the term "polymeric compound" should be understood to include oligomeric compounds that typically have a low polymerization degree. If the organic compound is polymeric, the SiH function may be contained in the terminating group of the polymeric chain and/or in a repeating unit of the polymeric compound. The organic compound having a Si—H group is typically a non-fluorinated compound.

In accordance with a preferred embodiment in connection with the present invention, the organic compound having a Si—H group is a polysiloxane (oligomer or polymer), comprising a polysiloxy backbone. Such polymer or oligomer may be terminated by a group containing one or more Si—H functions and/or may contain Si—H groups distributed along the backbone. The Si—H groups may form part of the backbone or they can be present in a side group attached to the backbone.

For example, the polysiloxanes for use with this invention include those that correspond to the formula:

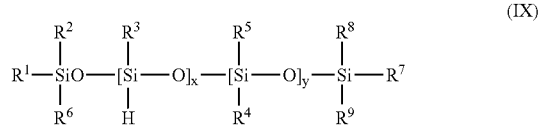

(IX)

wherein $R^1$, $R^2$, $R^3$, $R^6$, $R^7$, $R^8$ and $R^9$ each independently represents hydrogen, an alkoxy group, an alkyl optionally substituted such as for example with an aryl group, an ester, an alkoxy etc., or aryl group optionally substituted such as for example with an alkyl group, an ester, an alkoxy etc., $R^4$ and $R^5$ each independently represents an alkoxy group, an alkyl or aryl group each of which may optionally be substituted, x represents a value of 0 to 150, y represents a value of 0 to 150 and with the proviso that when x=0, at least one of $R^1$, $R^2$, $R^6$, $R^7$, $R^8$ and $R^9$ represents a hydrogen atom.

Specific examples of siloxanes include 1,1,3,3 tetraisopropyl disiloxane, diphenyl-1,1,3,3 tetrakis(dimethylsiloxy) disiloxane available from United Chem, silylhydride terminated poly(dimethylsiloxane), poly(methyl hydro siloxane) and copolymers of dimethylsiloxane and methylhydrosiloxane,polyethyl hydrosiloxane, poly phenyl dimethylhydrosiloxy siloxane, copolymers of methylhydrosiloxane and octyl methyl siloxane and, copolymers of methyl hydrosiloxane and phenyl methyl siloxane.

Further siloxanes that can be used may be cyclic such as those corresponding to the formula:

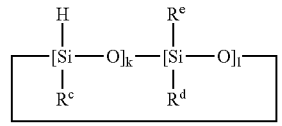

wherein $R^c$ represents hydrogen, an alkyl group or an aryl group, $R^d$ and $R^e$ each independently represents an alkyl or aryl group, k is at least 1 and the sum of k+1 is at least 3. Specific examples of cyclic siloxanes according to the above formula are 1,3,5-trimethyl cyclosiloxane and 1 phenyl-3, 3,5,5-tetramethyl cyclosiloxane.

Polysiloxanes and siloxanes having SiH groups are known in the art and can be produced according to well-known procedures such as disclosed in for example: Encyclopedia of Polymer Science and Engineering, Second Edition, V15, Silicones, pas. 204-308, John Wiley & Sons, 1989. Siloxanes having SiH groups are also generally commercially available. Preferably, the siloxane or polysiloxane will have a molecular weight between 150 g/mol and 70 000 g/mol The amount of organic compound having a Si—H group for use in the present invention may vary widely. Typically, the Si—H containing compound may be included in the composition in an amount of up to 90% by weight, preferably between 5% by weight and 60% by weight based on the total weight of fluorinated compound and auxiliary compounds.

Retroreflective Sheet

The retroreflective sheet for use in the invention comprises (i) a binder layer having at one of its major surfaces a layer of microspheres having a portion partially embedded in said major surface of said binder layer and having a portion partially protruding therefrom and (ii) a reflective layer disposed on the embedded portion of the microspheres.

Binder Layer

The binder layer typically comprises a flexible fluid-impermeable polymeric material that stabilizes the retroreflective sheet and supports the reflective optical system comprising the reflective layer and the micropheres. The polymeric material of the binder layer may include various elastomers, as well as thermoplastic binders wherein the binder attains a liquid or softened state via heating until molden. Preferably, the polymeric material includes a crosslinked or virtually crosslinked elastomer. A crosslinked elastomer means that the polymeric chains of the elastomer are chemically crosslinked to form a three dimensional network which is stabilized against molecular flow. A virtually crosslinked elastomer means that the polymeric chain mobility of the elastomer is greatly reduced by chain entanglement and/or by hydrogen bonding, resulting in an increase in the cohesive or internal strength of the polymer. Examples of such polymer crosslinking include carbon-carbon bond formation such as: free radical bonding between vinyl groups between chains; agent or group coupling such as by vulcanization or reaction with a coupling agent such as a diol in the case of isocyanate or epoxy functionalized polymers; a diisocyanate or an activated ester in the case of amine and alcohol functionalized polymers; and epoxides and diols in the case of carboxylic acid or anhydride functionalized polymers. Examples of such virtual crosslinking include amide hydrogen bonding as is found in polyamides or crystalline and amorphous region interactions as is found in block copolymers of styrene and acrylonitrile.

The binder layer also may contain optional additives such as stabilizers (for example, thermal and hydrolytic stabilizers), antioxidants, flame retardants, and flow modifiers (for example, surfactants), viscosity adjusters (for example, organic solvents), rheology modifiers (for example, thickeners), coalescing agents, plasticizers, tackifiers, and the like. The binder layer may be transparent, but commonly comprises colorants, such as for example, pigments, dyes or metal flakes as described in U.S. Pat. No. 5,812,317 (Billingsley) to provide special colors and visual effects. Generally, the binder layer contains from about 70% by weight up to about 99% by weight of a polymeric material with the remainder being optional additives in effective amounts.

Illustrative examples of the polymers that may be employed in the binder layer include: polyacrylates, polyolefins; polyesters; polyurethanes; polyepoxides; natural and synthetic rubbers; and combinations thereof. Examples of crosslinked polymers include the foregoing examples of polymers substituted with crosslinkable groups such as epoxide groups, olefinic groups, isocyanate groups, alcohol groups, amine groups or anhydride groups. Multifunctional monomers and oligomers which react with functional groups of the polymers may also be used as crosslinkers.

Specific examples of useful binder layer materials are disclosed in U.S. Pat. Nos. 5,200,262 and 5,283,101. In the '262 patent, the binder layer comprises one or more flexible polymers having active hydrogen functionalities such as crosslinked urethane-based polymers (for example, isocyanate cured polyesters or one of two component polyurethanes) and one or more isocyanate-functional silane coupling agents. In the '101 patent, the binder layer comprises an electron-beam cured polymer selected from the group consisting of chlorosulfonated polyethylenes, ethylene copolymers comprising at least about 70 weight percent polyethylene, and poly(ethylene-co-propylene-co diene) polymers.

Examples of commercially available polymers that may be used in the binder layer of the retroreflective sheet include Vitel™ 3550, Vitel™ VPE 5545 and VPE 5833 polyesters available from Shell Oil Company; Rhoplex™ HA-8 and NW-1845 acrylic resins available from Rohm and Haas; Cydrothane™ a polyurethane available from Cytec Industries of American Cyanamide; Estane™ 5703 and 5715 available from B.F. Goodrich, Nipol™ 1000, available from Zeon Chemicals and acrylonitrile butadiene rubbers, available from ABCR Binder layers comprising compositions that are durable, resistant to laundering and non-corrosive to the adjacent reflective elements are preferred.

An adhesion promoter may also be present in the binder layer in the amounts of 0.2% to about 1.5% by weight. Adhesion promoters are commonly aminosilanes such as aminomethyltrimethoxysilane, aminopropyltriethoxysilane, etc.

The binder layer may further be comprised of two or more layers. For example the binder layer may be comprised of one or more layers comprising an adhesion promoter and a layer that does not contain an adhesion promoter.

The binder layer preferably has a thickness of about 50 to 250 µm, more preferably about 75 to 200 µm. A binder layer having a thickness outside these ranges may be used. However, if the binder layer is too thin, it may not provide sufficient support to the retroreflective element and the microspheres and the microspheres may become dislodged. If the binder layer has a thickness of over 200 µm, it may unnecessarily stiffen the article and add to its cost.

The binder layer may also comprise a polymer composition which has inherent properties of an adhesive as described in U.S. Pat. No. 5,674,605 (Marecki), so that the binder layer may be used in certain instances to bond the reflective sheet to a garment or accessory without the use of-additional adhesive.

Microspheres

The retroreflective sheet comprises a monolayer of microspheres having a hemispheric reflective layer disposed thereon. The microspheres are partially embedded in and partially protruding from the front or the first major surface of the binder layer. The microspheres supported by the binder layer are capable of collimating light so that incident light is returned in a direction substantially parallel to the direction from which the light came. The microspheres preferably are substantially spherical in shape to provide uniform and efficient retroreflection. The microspheres also preferably are substantially transparent to minimize light absorption by the microspheres and thereby optimize the amount of light that is retroreflected by the article. The term transparent means that when viewed under an optical microscope (e.g., at 100X) the microspheres have the property of transmitting rays of visible light so that bodies beneath the microspheres, such as bodies of the same nature as the microspheres can be clearly seen through the microspheres, when both are immersed in oil of approximately the same refractive index as the microspheres. The outline, periphery or edges of bodies beneath the microspheres are clearly discernible. Although the oil should have a refractive index approximating that of the microspheres, it should not be so close that the microspheres seem to disappear as would be the case for a perfect match. The microspheres typically are substantially colorless but may be colored to produce special effects.

Transparent microspheres may be made from inorganic materials, such as glass or a non-vitreous ceramic composition, or can be made from organic materials such as a synthetic resin which possesses the required optical properties and physical characteristics needed for retroreflection. In general, glass and ceramic microspheres are preferred because they can be harder and more durable than microspheres made from synthetic resins.

Microspheres used in the present invention preferably have an average diameter of about 30 to 200 micrometers (µm), more preferably 40 to 90 µm. Microspheres smaller than 30 µm may tend to provide lower levels of retroreflection because of diffraction effects; whereas, microspheres larger than 200 µm may tend to impart undesirably rough texture to the article or undesirably reduce the flexibility thereof. Microspheres used in this invention preferably have a refractive index of about 1.7 to about 2.0, the range typically considered to be useful in microsphere-based retroreflective products where, as here, the front surface of the microspheres are exposed or air-incident. Examples of microspheres that may be useful in the present invention are disclosed in the following U.S. Pat. Nos.: 1,175,224, 2,461, 011, 2,726,161, 2,842,446, 2,853,393, 2,870,030, 2,939,797, 2,965,921, 2,992,122, 3,468,681, 3,946,130, 4,192,576, 4,367,919, 4,564,556, 4,758,469, 4,772,511, and 4,931,414.

The refractive index and the size of the microsphere are selected so that the microsphere focuses the incident light at a point roughly coincident with the location of the reflective layer. By appropriate selection of these parameters, the microsphere can easily focus the incident light at a point near the back surface of the microsphere or slightly behind the surface of the microsphere.

Reflective layer

The retroreflective sheet further comprises a reflective layer in order to reflect light. The reflective layer is disposed on the embedded portions of the micropheres to reflect light incident thereupon. The language "disposed on the embedded portion of the microspheres" means that the reflective layer is in direct contact with the microspheres (on the embedded portion) or is in contact with the microspheres through another reflective layer (for example, a dielectric mirror) or non-reflecting, so called light transmissible intermediate layer, as will be described furtheron.

The reflective layer may comprise reflective pigments or may be a reflective metal layer. The term "reflective metal layer" is used herein to mean a reflective layer comprising an effective amount of elemental metal to reflect incident light, preferably specularly reflect incident light. A variety of metals may be used to provide a specular reflective metal layer. These include aluminum, silver, chromium, nickel, magnesium, gold, and alloys thereof, in elemental form. Aluminum and silver are the preferred metals for use in the reflective metal layer. The reflective metal layer may be a continuous coating and may be produced by vacuum deposition, vapor-coating chemical deposition, or electroless plating techniques. Vacuum diposition and vapour coating techniques are preferred. Vapour coating means creating a stream of metal molecules or particles in a vacuum by techniques including, but not limited to evaporating and sputtering. The vapour coating operation may be achieved by placing a metal in an evaporator which is heated in a vacuum to a temperature high enough to vaporize the metal. Usually the vacuum pressure is about 0.133 to 1.33 pascals. Sputtering techniques also may be used to create a stream or cloud of metal molecules or particles in a vacuum. The molecules or particles created by vapour coating are adhered to the backside of the microspheres. In this form, the reflective metal layer consists essentially of pure metal. There is no need for a resin matrix to support the metal particles. It is to be understood that in the case of aluminum, some of the metal may be in the form of the metal oxide and/or hydroxide. Aluminum and silver metals are preferred because they tend to provide the highest retroreflective brightness. The metal layer should be thick enough to reflect incoming light. Typically, the reflective metal layer is about 50 to 150 nanometers thick. Although the reflective color of a silver coating can be brighter than an aluminum coating, an aluminum layer normally is more preferred because it can provide better laundering durability when adhered to a glass optical element.

Alternatively, the reflective layer may comprise reflective pigments such as, for example, mica powder, metal particles or flakes or pearlescent type pigments.

Additional Layers

The retroreflective sheet may comprise further layers. As mentioned above, a so-called light-transmissible intermediate layer can be present. A light-transmissible layer is typically arranged between the microspheres and the reflective layer, e.g., a reflective metal layer. The light-transmissible intermediate layer can be provided to protect the reflective element from corrosion and deterioration in its reflective characteristics during exposure to the natural elements and/or laundering. The intermediate layer preferably comprises a transparent polymeric layer having optical characteristics such as refractive index which are selected so as to provide a functional retroreflective optical system.

The light-transmissible intermediate layer generally comprises a polymeric material that may be the same as or different from the polymeric material of the binder layer. To provide good laundering durability, the polymer preferably is a crosslinked polymer. Examples of polymers that may be suitable include those that contain units of urethane, ester, ether, urea, epoxy, carbonate, (meth)acrylate, acrylic, olefin, vinyl chloride, amide, alkyd, or combinations thereof.

The polymer that is used in the light-transmissible intermediate layer may have functional groups that allow the polymer to be linked to the silane coupling agent, or the reactants that form the polymer may possess such functionality. For example, in producing polyurethanes, the starting materials may possess hydrogen functionalities that are capable of reacting with an isocyanate-functional silane coupling agent; see for example, U.S. Pat. No. 5,200,262 (Li). Preferred polymers are crosslinked poly(urethane-ureas) and crosslinked poly(acrylates). These polymers can maintain their properties under the rigors of the industrial laundering process and when being worn as clothing.

Poly(urethane-ureas) may be formed by reacting a hydroxy-functional polyester resin with excess polyisocyanate. Alternatively, a polypropylene oxide diol may be reacted with a diisocyanate and then with a triamino-functionalized polypropylene oxide.

Crosslinked poly(acrylates) may be formed by exposing acrylate oligomers to electron beam radiation; see for example, U.S. Pat. No. 5,283,101 (Li).

Examples of commercially available polymers that may be used in the light-transmissible intermediate layer include: Vitel™ 3550 available from Shell Oil Company, Akron, Ohio; Ebecryl™ 230 available from UBC Radcure, Smryna, Ga.; Jeffamine™ T-5000, available from Huntsman Corporation, Houston, Tex.; and Arcol™ R-1819, available from Arco Chemical Company, Newtown Square, Pa.

The thickness of the light-transmissible intermediate layer is generally selected such that incident light can be focussed on the reflective metal layer by the microspheres. The light-transmissible intermediate layer typically has an average thickness from about 5 nanometers to 1.5 times the average diameter of the microspheres. Preferably, the light-transmissible intermediate layer has an average thickness from about 100 nanometers to about the average diameter of the microspheres. More preferably, the light-transmissible intermediate layer's average thickness is about one (1) micrometer to about 0.25 times the average diameter of the microspheres. The light-transmissible intermediate layer thickness may be greater between the microspheres than on the microspheres. The light-transmissible intermediate layer preferably is continuous, but there may be some very small regions—particularly at the most embedded portion of the microspheres—where the light-transmissible intermediate layer is discontinuous, i.e., its thickness is zero or approaches zero. Thus, the light-transmissible intermediate layer is conveniently continuous or substantially continuous.

Further additional layers can be present in the retroreflective sheet. These layers may for example serve to provide additional support and handleability of the reflective sheet or may be present to provide adhesion characteristics to be used for attachment of the reflective sheet to a substrate such as a safety garment or accessory. Examples of additional layers include a woven or non-woven web, a heat-activated adhesive layer, a pressure-sensitive adhesive layer or combinations of these layers. Particularly preferred is the use of a woven web as an additional layer so that a reflective fabric is generated.

A woven or non-woven web may be composed of any known fiber materials including for example polyamide, polyester, polyacrylate, polyacylonitrile fibers as well as natural fibers such as cotton. Mixed fibers including mixed synthetic and natural fibers can be used as well.

Suitable adhesive layers for use with the reflective sheet include for example, a heat-activated adhesive, comprising a polyester, polyurethane or vinyl-based polymer, or a normally tacky pressure-sensitive adhesive comprising an acrylic polymer, a rubber-resin based system or a silicone-based polymer.

Specific combinations of additional layers include 1) a pressure-sensitive adhesive layer with a fabric and 2) a pressure-sensitive adhesive layer in combination with a heat-activated adhesive layer. In order to protect the adhesive layer, a protective liner, such as a siliconised paper liner, may be used. In the two combinations just described, the pressure-sensitive adhesive is arranged so that it is exposed in order to form a bond with the substrate or garment.

Various constructions of the retroreflective sheet may be used. For example, in a first embodiment, the retroreflective sheet comprises a layer of microspheres partially exposed at the first major surface of the retroreflective sheet to air, a light-transmissible intermediate layer, a metal layer as the reflective layer and a binder layer. In this first embodiment of the retroreflective sheet, light falls upon the surface of the microspheres, is focussed upon the reflective metal layer located at a specific distance behind the non-exposed part of the microsphere through the selected thickness of the light-transmissible intermediate layer and is then reflected back through the microsphere to the observer. Accordingly, a highly retroreflective sheet is obtained. On the binder layer there may be provided additional layers such as for example a woven or non-woven web.

In a second embodiment of the retroreflective sheet, the reflective layer comprises a reflective metal layer that is provided directly on the microspheres and that thus generally follows the contours of the non-exposed part of the microspheres. No light-transmissible intermediate layer is present. The reflective layer in this embodiment comprises a thin metal layer preferably applied directly to the non-exposed part of the microspheres by vacuum-deposition techniques. Typically, a binder layer and additional layers are further provided on the thin metal layer as in the first embodiment.

The manufacture of retroreflective sheets is well known in the art. Open-bead retroreflective sheets can be made according to the teachings of EP 759 179 or EP 1 262 802.

The retroreflective sheets can be applied to a variety of substrates. Often the substrate is, or becomes, the outer surface of an article of clothing, so that the retroreflective sheet is displayed when the clothing is worn in its normal orientation on a person. The substrate may be, for example, a woven or nonwoven fabric such as a cotton fabric; a polymeric layer including nylons, olefins, polyesters, cellulosics, urethanes, vinyls, acrylics, rubbers; leather; and the like. One preferred substrate for use in the invention is a polyester nylon tricot knitted fabric treated with a fire retardant material. The substrate also could be rigid, metal surface such as the body of a motor vehicle, the walls of a truck trailer, or the surface of a helmet.

Retroreflective sheets for use in the invention may be applied to a substrate using a variety of methods. In one method, the binder layer of the retroreflective sheet is heat laminated directly to the underlying substrate. Alternatively, the retroreflective sheet may be mechanically secured to the substrate by, for example, sewing. In some applications, however, it is desired to secure the sheet to the substrate by use of an adhesive layer disposed on the back or second surface of the binder layer. The adhesive layer may be a pressure-sensitive adhesive, a heat-activated adhesive, or an ultraviolet-radiation-activated adhesive. A fire retardant material, such as a brominated biphenol (for example, decabromodiphenyl oxide, Saytex™ 102E, Ethyl Corporation, Baton Rouge, La.), can be placed in the adhesive.

Treatment Method

In the treatment method, the retroreflective sheet is contacted with the treatment composition comprising fluorinated compound comprising silane and one or more auxiliary compounds at the major surface having the exposed microspheres. The treatment composition is generally applied to the surface of the reflective sheet in amounts sufficient to produce a coating that yields a desired water repellency and/or improvement of the reflective properties, especially after repeated launderings and under rainfall conditions. This coating can be extremely thin, e.g., 1 to 50 molecular layers, though in practice a useful coating may be thicker.

In one embodiment, the treatment composition comprising fluorinated silane and the auxiliary compounds is prepared as a solution or dispersion in water. Therefor, a mixture of fluorinated silane and the auxiliary compounds is vigorously stirred in water at neutral pH, typically at a temperature between 20 and 70 °C., preferably between 30 and 65 °C. and during a time sufficient to dissolve or disperse the products. Additional emulsifiers can be used to increase the dispersion stability. Conventional cationic, non-ionic, anionic and zwitterionic emulsifiers are suitable. The emulsifier can be used in an amount effective to stabilize the dispersion and will preferably by used in an amount of about 0 to 25 parts by weight, preferably about 5 to about 10 parts by weight, based on 100 parts by weight of the composition. Other components, such as silica or $TiO_2$, can be present, as well as other aqueous water extenders known to those skilled in the art. Examples include melamines, urethanes and the like.

As an alternative, the treatment composition may be applied as a dispersion or solution in solvent. The organic solvent may comprise a single organic solvent or a mixture of two or more organic solvents. The solvent(s) used in the composition preferably include those that are substantially inert (i.e., substantially nonreactive with the fluorinated silane and non-destructive for the retroreflective sheet). Suitable organic solvents, or mixtures of solvents can be selected from aliphatic alcohols, having 1 to 4 carbon atoms, such as methanol, ethanol, isopropylalcohol; ketones such as acetone or methyl ethyl ketone; esters, such as ethyl acetate; ethers, such as diethyl ether, diisopropylether and methyl t-butylether and halogenated solvents including fluorinated solvents. Examples of suitable fluorinated solvents include fluorinated hydrocarbons, such as perfluorooctane, partially fluorinated hydrocarbons, such as pentafluorobutane; hydrofluoroethers, such as methyl perfluorobutyl ether and ethyl perfluorobutyl ether. Various blends of fluorinated organic solvents with non-fluorinated organic solvents or other halogenated solvents can be used.

To achieve good durability, particularly with respect to mechanical washing or laundering, the solutions or dispersions in solvent preferably also include water. Typically, the amount of water will be between 0.1 and 20% by weight, preferably between 0.5% by weight and 15% by weight, more preferably between 1 and 10% by weight.

The compositions used in the treatment method of the present invention may also include an acid or base catalyst. The acid catalyst, if present, comprises an organic or inorganic acid. Organic acids include acetic acid, citric acid, formic acid and the like. Examples of inorganic acids include sulphuric acid, hydrochloric acid and the like. The acid will generally be included in the composition in an amount between about 0.01 and 10%, more preferably between 0.05 and 5% by weight. The base catalyst, if present, comprises for example sodium or potassium hydroxide.

The treatment composition is typically a relatively diluted solution or dispersion, containing between 0.05 and 30 percent by weight, preferably between 0.05 and 20 percent by weight, and more preferably between 0.1 and 5 percent by weight of fluorinated compound and auxiliary compounds.

A wide variety of coating methods can be used to treat the surface of a retroreflective sheet. The methods include spraying, dipping, gravure printing, screen printing, tampon printing, transfer coating, knife coating, kiss coating and Foulard application techniques. Preferred methods include Foulard application and spraying. A particular preferred method is kiss coating, as described in EP 1,262,802. The surface of the retroreflective sheet can further be treated and/or retreated during one or more laundry cycles in a laundering machine. Therefore, the treating composition, typically as an aqueous emulsion will be added during the last rinsing of a laundering cycle.

A drying step is typically incorporated into the method to allow for removal of the solvent and/or water to produce the finished coating of fluorinated silane and auxiliary compounds on the surface of the retroreflective sheet. The drying steps may comprise one or more phases effecting evaporation of solvents and/or water under ambient conditions and/or utilization of forced air ovens at elevated temperatures to accelerate removal of solvents and/or water and/or accelerate the reaction of the fluorinated silane compound with the auxiliary compounds and with the surface of the retroreflective sheet. Preferably, the treated retroreflective sheet will be subjected to a temperature of between 50° C. and 180° C. and for a time sufficient to dry and cure the treated retroreflective sheet.

The following examples further illustrate the invention without the intention however to limit the invention thereto.

EXAMPLES

The following examples further illustrate the invention without the intention however to limit the invention thereto. All parts are by weight unless indicated otherwise.

Abbreviations

MeFBSEMA: N-methyl perfluorobutyl sulfonamido ethylmethacrylate
MeFBSEA: N-methyl perfluorobutyl sulfonamido ethylacrylate
A-160: $HS(CH_2)_3Si(OCH_3)_3$, available from Aldrich
A-174: $CH_2=C(CH_3)C(O)O(CH_2)_3 Si(OCH_3)_3$, available from Aldrich
L31: polymethylhydrosilane, available from GE Chem Specialties
TEOS: tetraethoxysilane
EHT: Tetra (2-ethylhexyl) ortho titanate
ABIN: azo-bisisobutyronitrile
MEK: methylethyl ketone
Arquad 2HT/75: dicocodimethylammoniumchloride, available from Akzo
PES/CO fabric: 65/35 polyester/cotton fabric, having a weight of 215 $g/m^2$, available from Lauffenmuihle GmbH Test Methods Measurement of Retroreflectivity of Retroreflective Sheets, R'

Reflectivity of the retroreflective sheet was measured according to the International commission on Illumination or CIE (Commission Internationale de l'éclairage) 54: 1982 Retroreflection: Definition and Measurement. Samples were measured at an observation angle ($\alpha$) of 0.2° and an entrance angle ($\beta 1$) of 5°. Results were recorded in candela per lux per sq. meter ($cd/lx/m^2$).

Measurement of Wet Retroreflectivity of Retroreflective Sheets, R'

In order to measure wet retroreflectivity, 10×10 $cm^2$ samples of retroreflective sheets were sewn onto PES/CO fabric (65/35) before testing. Measurement of the retroreflectivity of retroreflective sheets under simulated rainfall conditions was performed in general according to the CIE method above but under conditions described specifically in EN 471 ANNEX A—Method of Measuring Wet Retroreflective Performance. The measurement was made after 5 minutes continuing simulated rainfall.

Samples were measured at an observation angle ($\alpha$) of 0.2° and an entrance angle ($\beta 1$) of 5°. Results were recorded in $cd/lx/m^2$.

Spray Rating (SR) and $\Delta$weight (g)

The spray rating of a treated substrate is a value indicative of the dynamic repellency of the treated substrate to water that impinges on the treated substrate. The repellency of 18×15 $cm^2$ weighed samples was measured by Standard Test Number 22, published in the 1985 Technical Manual and Yearbook of the American Association of Textile Chemists and Colorists (AATCC), but using a slightly different 'spray rating' for the tested substrate. The spray rating was obtained by spraying 250 ml water on the substrate from a height of 15 cm. The wetting pattern was visually rated using a 0 to 100 scale, where 0 meant complete wetting and 100 meant no wetting at all. A value of 80 meant that during spraying, some incontinuous rays and some drops of water were noticed on the panel. The panel were weighed before and after the test (after removal of not adhered water). The weight increase was reported as $\Delta$weight (g). The samples were prepared in triplicate and the values reported are the average of the three measurements.

Contact Angles (°)

The treated retroreflective sheets were tested for their contact angles versus water (W) and n-hexadecane (0) using an Olympus TGHM goniometer. The contact angle with water reflects the water repellency of the coating; the contact angle with hexadecane is indicative of anti-soiling and anti-staining properties. The contact angles were measured before (initial) and directly after abrasion (abrasion). The values are the mean values of 4 measurements and are reported in degrees. The minimum measurable value for a contact angle was 20. A value <20 meant that the liquid spread on the surface.

Washing Procedure for Retroreflective Sheets

Home Laundering:

Samples of treated and untreated retroreflective sheets (100 $cm^2$) were sewn to 65/35 PES/CO fabric. The fabrics were laundered according to ISO 26330 Textiles—Domestic Washing and Drying Procedures for Textile Testing. Washing was performed in domestic washing machines at 60° C. and the number of cycles is given in the data tables below.

Industrial Laundering:

Both treated and untreated samples of retroreflective sheets were laundered according to ISO 15797 (8) and tunnel finishing, for 30 cycles.

Materials Employed in the Examples

Fluorinated Compounds having One or More Silyl Groups (FC):

(A) Fluorinated Oligomer Silane MeFBSEMA/A-160 8/1:

In a three-necked flask of 1000 ml, fitted with a condenser, stirrer, thermometer, heating mantle and heating control were placed 425 g (1 mole) MeFBSEMA and 24.54 g (0.125 moles) A-160, 300 g ethylacetate and 0.9 g ABIN.

The mixture was degassed three times using aspirator vacuum and nitrogen pressure. The mixture was reacted under nitrogen at 80° C. during 8 hours. A clear solution of the oligomeric fluorochemical silane MeFBSEMA/A-160 in a molar ratio of about 8/1 was obtained. Unless otherwise indicated, the solvent was not evaporated before use in the treatment composition.

(B) Fluorinated Oligomer Silane MeFBSEA/A-174/A-160 4/1/1:

In a three-necked flask of 500 ml, fitted with a condenser, stirrer and thermometer, were placed 41.1 g (0.1 moles) MeFBSEA, 6.2 g (0.025 moles) A-174, 4.9 g (0.025 moles) A-160, 35 g ethylacetate and 0.1 g ABIN. The mixture was degassed three times using aspirator vacuum and nitrogen pressure. The mixture was reacted under nitrogen at 75° C. during 8 hours. An additional 0.05 g ABIN was added and the reaction was continued for another 3 hrs at 75° C.; another 0.05 g ABIN was added and the reaction continued at 82° C. for 2 hrs. A clear solution of the oligomeric fluorochemical silane MeFBSEA/A-174/A-160 in a molar ratio 4/1/1 was obtained. Unless otherwise indicated, the solvent was not evaporated before use in the treatment composition.

(C) Fluorinated Polyether Disilane

Fluorinated polyether disilane (C) was prepared by reacting perfluoropolyetherdiester $CH_3OC(O)CF_2(CF_2O)_{9-11}(CF_2CF_2O)_{9-11}CF_2C(O)OCH_3$ (with an average molecular weight of about 2000), commercially available from Ausimont, Italy, under the trade designation Z-DEAL, with 3-aminopropyltriethoxysilane, available from Aldrich Company Co., as taught in U.S. Pat. No. 3,810,874 (Mitsch et al.), Table 1, line 6. The exothermic reaction proceeded readily at room temperature, simply by mixing the starting materials. The progress of the reaction was monitored by infrared analysis. Unless otherwise indicated, after reaction, 10 parts of fluorinated polyether disilane were mixed with 60 parts TEOS and 30 parts ethanol. This mixture, indicated as FC(C) was used in the examples.

Examples 1 to 4 and Comparative Examples C-1 and C-2

In Examples 1 and 3, retroreflective fabric web described above in the section on the retroreflective sheet as the first (1) and second (2) embodiment of the retroreflective sheet were treated with a mixture of 0.1 g fluorinated compound (B), 0.6 g TEOS, 3 g acetic acid, 1.5 g water and 100 g ethanol by spray application at about 20 ml./min. In Examples 2 and 4, retroreflective fabric web of the first (1) and second (2) embodiment were treated with a mixture of 1 g FC (C) (containing 0.1 g fluorinated polyether disilane (C), 0.6 g TEOS and 0.3 g ethanol), 3 g acetic acid, 1.5 g water and 100 g ethanol. After spraying, the substrates were dried and cured at 120° C. for 5 min. For Comparative Examples C-1 and C-2, untreated retroreflective sheets of the first (1) and second (2) embodiment respectively, were used. In Comparative Example C-3, retroreflective fabric wet of the first embodiment was treated by spray application, with a mixture of 0.1 g fluorochemical disilane (C), 0.3 g acetic acid,1.5 g water and 100 g ethanol. The contact angles were measured initially and after abrasion, using an Erichsen cleaning machine, 3M High Performance wipe available from 3M Company) and Mister Propre cleaner (available from Henkel), using 5000 cycles. The results are given in Table 1.

TABLE 1

Contact angles of retroreflective sheet

| Ex. No. | Fluorinated compound | Retroreflective fabric of embodiment | Contact angles (°) | | | |
|---|---|---|---|---|---|---|
| | | | DI-water | | n-hexadecane | |
| | | | Initial | Abraded | Initial | Abraded |
| 1 | B | 1 | 108 | 80 | 67 | 50 |
| 2 | FC (C) | 1 | 102 | 90 | 63 | 55 |
| 3 | B | 2 | 100 | 82 | 62 | 50 |
| 4 | FC (C) | 2 | 106 | 92 | 65 | 55 |
| C-1 | / | 1 | 75 | 53 | <20 | <20 |
| C-2 | / | 2 | 85 | 55 | <20 | <20 |
| C-3 | C | 1 | 92 | 70 | 65 | 45 |

The results indicated that retroreflective sheets having high water repellency were obtained, both initial and after extended abrasion. The addition of a non-fluorinated auxiliary compound clearly improves the water repellency. The treated retroreflective sheets further showed high anti-soiling properties as was reflected by the contact angles towards cyclohexane.

Examples 5 and 6 and Comparative Example C-4

In Examples 5 and 6, 18×15 cm² panels of retroreflective fabric according to the second embodiment and sewn onto PES/CO fabric, were treated with a solution of 0.02 g L31, 0.05 g fluorinated oligomer silane (A), 10 g MEK and 0.02 g TEOS (ex 5) or 0.02 g EHT (ex 6), using a K1 coating bar (available from RK Print-Coat Instruments, Ltd.South View Laboratories, Litlington, Royston, Herts SG8 0QZ UK) providing 6 g/m². The samples were allowed to dry at room temperature for 3 min and were cured at 100° C. for 10 min. Comparative Example C-4 was made with untreated retroreflective sheet of the second embodiment. Initial water repellency was measured; the mean values of 3 measurements are recorded in Table 2. The durability of the wet reflectance after repeated home launderings was measured according to EN 471, Annex A. The results are recorded in Table 3 (mean values of the results of duplicated panels).

TABLE 2

Initial water repellency

| Example | SR | Δ weight (g) |
|---|---|---|
| 5 | 80 | 0.07 |
| 6 | 80 | 0.04 |
| C-4 | 70 | 0.15 |

TABLE 3

Durability of retroreflectance (EN 471, Annex A)

| | Retroreflectance R' (cd/lx/m²) | | |
|---|---|---|---|
| Example | Dry | 2 min wet | 5 min wet |
| *No home laundering* | | | |
| 5 | 697 | 548 | 531 |
| 6 | 649 | 525 | 504 |
| C-4 | 626 | 443 | 423 |
| *20 home launderings (60° C.)* | | | |
| 5 | 495 | 308 | 283 |
| 6 | 515 | 329 | 302 |
| C-4 | 520 | 318 | 269 |
| *25 home launderings (60° C.)* | | | |
| 5 | 540 | 347 | 324 |
| 6 | 482 | 267 | 246 |
| C-4 | 511 | 251 | 153 |
| *30 home launderings (60° C.)* | | | |
| 5 | 500 | 297 | 247 |
| 6 | 484 | 233 | 146 |
| C-4 | 493 | 246 | 113 |
| *35 home launderings (60° C.)* | | | |
| 5 | 523 | 280 | 190 |
| 6 | 481 | 227 | 141 |
| C-4 | 479 | 139 | 94 |

The results indicated that the retroreflective sheets, treated with a composition comprising a fluorinated compound and auxiliary compounds had highly durable retroreflective properties. The retroreflectance remained high, even after repeated home launderings. Also high wet retroreflectance was noticed.

Examples 7 and 8 and Comparative Examples C-5 and C-6

In Examples 7 and 8, retroreflective fabric webs according to the first (1) and second (2) embodiment were coated with a solution of 0.2 g L31, 0.88 g of a 56.9% fluorinated oligomer solution (A) as prepared above and 0.2 g TEOS, dissolved in 100 g MEK, using a K1 coating bar (6 g/m²). The samples were allowed to dry for 10 min and were cured at 100° C. during 10 min in a Heraeus drying oven, model 2721. Comparative Examples C-5 and C-6 were made with untreated retroreflective sheets of the first and second embodiment. The reflective properties of the treated retroreflective fabric were evaluated after 45 home launderings. The results are given in Table 4.

TABLE 4

Durability of retroreflectance after 45 home launderings (EN 471, Annex A)

| | Retroreflective web | Retroreflectance R' (cd/lx/m²) | |
|---|---|---|---|
| Ex. No. | of embodiment | Dry | 2 min wet |
| 7 | 2 | 518 | 108 |
| 8 | 1 | 432 | 224 |
| C-5 | 2 | 508 | 38 |
| C-6 | 1 | 545 | 45 |

The results in the table indicate that the treated retroreflective sheets showed a considerable improvement in wet reflectance, compared to untreated retroreflective sheets after 45 home launderings.

Examples 9 and 10

In Examples 9 and 10, retroreflective fabrics of the first and second embodiment, sewn against PES/CO fabric were treated with a mixture of precondensed TEOS, fluorinated oligomer solution (A) and compound having Si—H group. In a first step, the precondensation of TEOS was done by mixing and stirring 50 g TEOS, 44 g ethanol, 2.17 g DIWater and 0.27 g HCl (37%) for 48 hours in a 125 ml reaction flask. The solvent was stripped off at 1 mm Hg pressure during 1 hour at 53° C. In a second step, the treatment composition was prepared. Therefore, 0.2 g of the reaction product, prepared in the first step, was dissolved in 100 g MEK, together with 0.2 g L31 and 0.88 g of a 56.9% fluorinated oligomer silane solution (A). This mixture was coated onto retroreflective fabrics using a K1 coating bar (6 g/m²). The samples were allowed to dry for 10 min and were cured at 100° C. during 10 min in a Heraeus drying oven, model 2721. The reflective properties of the treated retroreflective fabric were evaluated after 45 home launderings. The results are given in Table 5.

TABLE 5

Retroreflectance after 45 home launderings (acc. to EN 471, Annex A)

| | Retroreflective web | Retroreflectance R' (cd/lx/m²) | |
|---|---|---|---|
| Ex. No. | of embodiment | Dry | 2 min wet |
| 9 | 2 | 525 | 83 |
| 10 | 1 | 437 | 205 |
| C-5 | 2 | 508 | 38 |
| C-6 | 1 | 545 | 45 |

The results indicated that highly durable retroreflectance could be obtained with a treatment composition comprising fluorinated compound, precondensed TEOS and SiH group containing compound.

Examples 11 to 14

The treated retroreflective sheets as prepared in Examples 7-10 were tested for their resistance to industrial laundering cycles (30 cycles). The durability was tested with and without re-treatment after 20 cycles. For the re-treatment after 20 cycles, for Examples 11 and 13, emulsions were prepared comprising fluorinated oligomer silane (A), TEOS and L31. In a first step, 30 g Arquad 2HT/75 and 300 g ethylacetate were stirred and heated until a clear emulsion was formed (55° C.). 100 g TEOS were added as well as 400 g of a 60% fluorinated oligomer silane solution (A). After stirring, the mixtures turned homogeneous. 100 g L31 were added and the mixtures were heated to 60° C. In a separate flask, 10 g of a 5 g/l aqueous solution of detergent for industrial laundering (as described in ISO 15797, annex A1) was added to 880 g DI water. The mixture was stirred and heated to 47° C. The fluorochemical mixture prepared above was slowly added to the detergent mixture under vigorous stirring. The stable pre-emulsion was poured into a MG-emulsifier (type LAB60-10TBS), set at 55° C. and a pressure of 260/20 bar. After the emulsion passed a first time, it was poured again in the MG for a second pass. The emulsion became viscous. DIWater was added to obtain 1920 g total. The emulsion was stripped at 46° C. using a rotavapor to obtain a 28% solids emulsion. The treatment emulsions for Examples 12 and 14 were made according to the same method, but using precondensed TEOS (as prepared in Examples 9 and 10). For all Examples, 10 ml/l water of the emulsions was added to the container of an industrial laundering machine, assigned for the addition of softener, during the last rinsing of the 20$^{th}$ industrial laundering cycle. The samples were dried in a batch drier. The performance was tested after 10 additional industrial washings. The reflectance was measured and compared to the same samples that were subjected to 30 laundry cycles without re-treatment after 20 cycles. The results are given in Table 6.

TABLE 6

Retroreflectance after 30 cycles industrial laundering (acc. to EN 471, Annex A)

| | | Retroreflectance (R') (cd/lx/m$^2$) | | | |
|---|---|---|---|---|---|
| | | No re-treatment | | Re-treatment after 20 cycles | |
| Ex. No. | Treatment of ex | Dry | After 2 min (wet) | Dry | After 2 min (wet) |
| Retroreflective fabric of 2$^{nd}$ embodiment | | | | | |
| 11 | 7 | 207 | 102 | 224 | 130 |
| 12 | 9 | 165 | 72 | 233 | 134 |
| Retroreflective fabric of 1$^{st}$ embodiment | | | | | |
| 13 | 8 | 109 | 70 | 138 | 92 |
| 14 | 10 | 139 | 94 | 154 | 107 |

Retroreflective fabric sheets with high retroreflectance were obtained, even after 30 industrial launderings. Depending on the retroreflective fabric, further improvement can be obtained by re-treating the treated substrates with an additional amount of fluorochemical composition.

It is claimed:

1. Method of treatment comprising contacting a retroreflective sheet comprising (i) a binder layer having at one of its major surfaces a layer of microspheres having a portion partially embedded in said major surface of said binder layer and having a portion partially protruding therefrom and (ii) a reflective layer disposed on the embedded portion of the microspheres, with a treatment composition comprising:
   (i) a fluorinated compound having one or more fluorinated groups and one or more silyl groups that have one or more hydrolysable groups, wherein said fluorinated compound is an oligomer derived from a polymerization of at least one fluorinated monomer in the presence of a chain transfer agent and optionally one or more non-fluorinated monomers; and
   (ii) an auxiliary compound selected from the group consisting of (1) one or more non-fluorinated compounds of an element M selected from the group consisting of Si, Ti, Zr, B, Al, Ge, V, Pb and Sn having at least one hydrolysable group per molecule, (2) an organic compound having a Si—H group and mixtures thereof.

2. Method according to claim 1 wherein said treatment composition comprises an aqueous dispersion of said fluorinated compound and said auxiliary compound.

3. Method according to claim 1 wherein said treatment composition comprises a dispersion or solution of said fluorinated compound and said auxiliary compound in an organic solvent.

4. Method according to claim 1 wherein said oligomer is derived from a polymerization of at least one fluorinated monomer and one or more non-fluorinated monomers in the presence of a chain transfer agent and wherein at least one of said non-fluorinated monomers and/or said chain transfer agent comprises a silyl group that has one or more hydrolysable groups.

5. Method according to claim 1 wherein said hydrolysable group of said silyl group of said fluorinated compound and/or said hydrolysabi e group of said non-fluorinated compound is selected from the group consisitag of halogens, alkoxy groups, aryloxy groups and acyloxy groups.

6. Method accordine to claim 1 wherein said non-fluorinated compound corresponds to the formula:

wherein R represents a non-hydrolysable group, M represents an element selected from the group consisting of Si, Ti, Zr, B Al, Ge, V, Pb and Sn, j is 3 or 4 depending on the valence of M, i is 0, 1 or 2, and Y represents a hydrolysable group.

7. Retroreflective article obtained by the method of claim 1.

8. Method of treatment comprising contacting a retroreflective sheet comprising (i) a binder layer having at one of its major surfaces a layer of nticrospheres having a portion partially embedded in said major surface of said binder layer and having a portion partially protruding therefrom and (ii) a reflective layer disposed on the embedded portion of the microspheres, with a treatment composition corupri sing:
   (i) a fluorinated compound comprisina one or more fluorinated polyether groups having one or more fluorinated groups and one or more silyl groups that have one or more hydrolysable groups; and
   (ii) an auxiliary compound selected from the group consisting of (1) one or more non-fluorinated compounds of an element M selected from the group consisting of Si, Ti, Zr, B, Al, Ge, V, Pb and Sn having at least one hydrolysable group per molecule, (2an organic compound having a Si—H group and mixtures thereof.

9. Retroreliecuve article obtained by the method of claim 8.

* * * * *

UNITED STATES PATENT AND TRADEMARK OFFICE
CERTIFICATE OF CORRECTION

PATENT NO. : 7,247,386 B2 Page 1 of 1
APPLICATION NO. : 10/744684
DATED : July 24, 2007
INVENTOR(S) : Gert A. M. Hooftman It is certified that error appears in the above-identified patent and that said Letters Patent is hereby corrected as shown below:

Column 13
Line 23, delete "SiH" and insert in place thereof -- Si-H --.

Column 14
Line 18, delete "SiH" and insert in place thereof -- Si-H --.
Line 23, delete "SiH" and insert in place thereof -- Si-H --.
Line 45, delete the word "micropheres" and insert in place thereof -- microspheres --.

Column 17
Line 7, delete the word "micropheres" and insert in place thereof -- microspheres --.

Column 24
Line 48, delete "Ltd.South" and insert in place thereof -- Ltd. South --.

Column 28
Line 21, delete the word "hydrolysasbie" and insert in place thereof -- hydrolysable --.
Line 22, delete the word "consistag" and insert in place thereof -- consisting --.
Line 24, delete the word "accordine" and insert in place thereof -- according --.
Line 30, after "B" insert -- , --.
Line 37, delete the word "nticrospheres" and insert in place thereof -- microspheres --.
Line 41, delete the word "coruprising:" and insert in place thereof -- comprising: --.
Line 42, delete the word "comprisina" and insert in place thereof -- comprising --.
Line 50, delete "(2an" and insert in place thereof -- (2) an --.
Line 52, delete the word "Retroreliecuve" and insert in place thereof
-- Retroreflective --.

Signed and Sealed this

Eleventh Day of December, 2007

JON W. DUDAS
*Director of the United States Patent and Trademark Office*